J. SACHS.
SAFETY ELECTRICAL CONNECTING APPLIANCE.
APPLICATION FILED NOV. 3, 1915.
1,365,729. Patented Jan. 18, 1921.
5 SHEETS—SHEET 2.
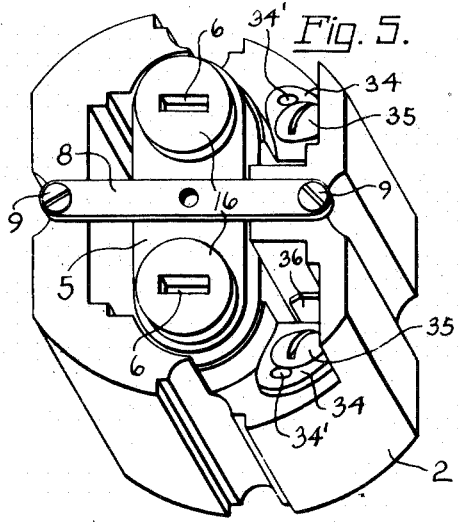
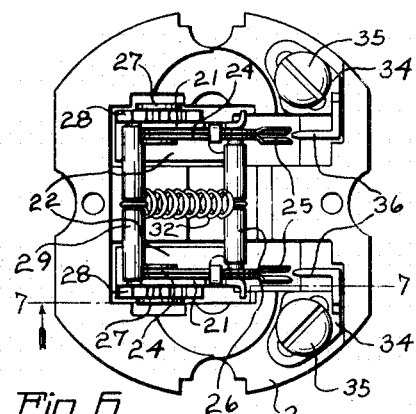
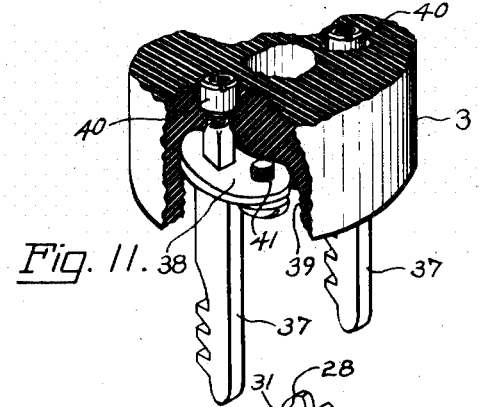
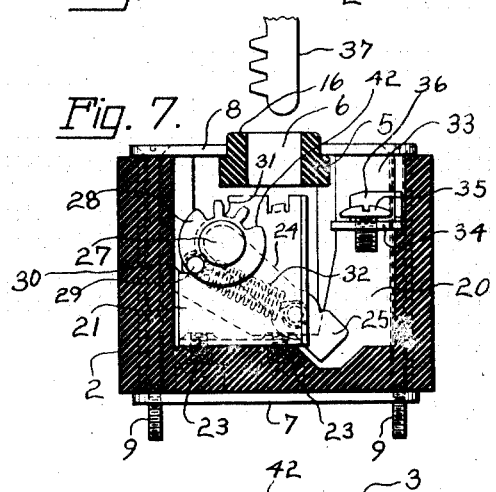
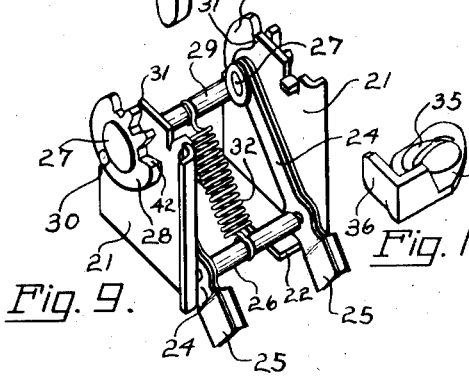
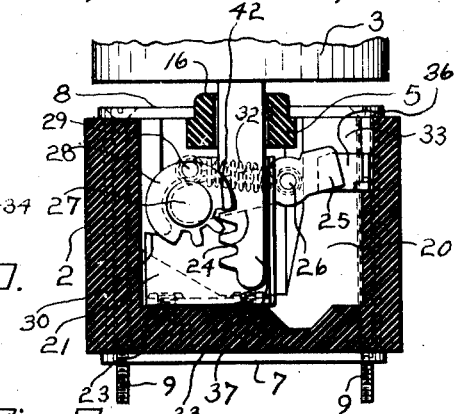
Witnesses
Otto Hilton.
Franz Wolff
Inventor
Joseph Sachs.
By Sutherland
Attorney

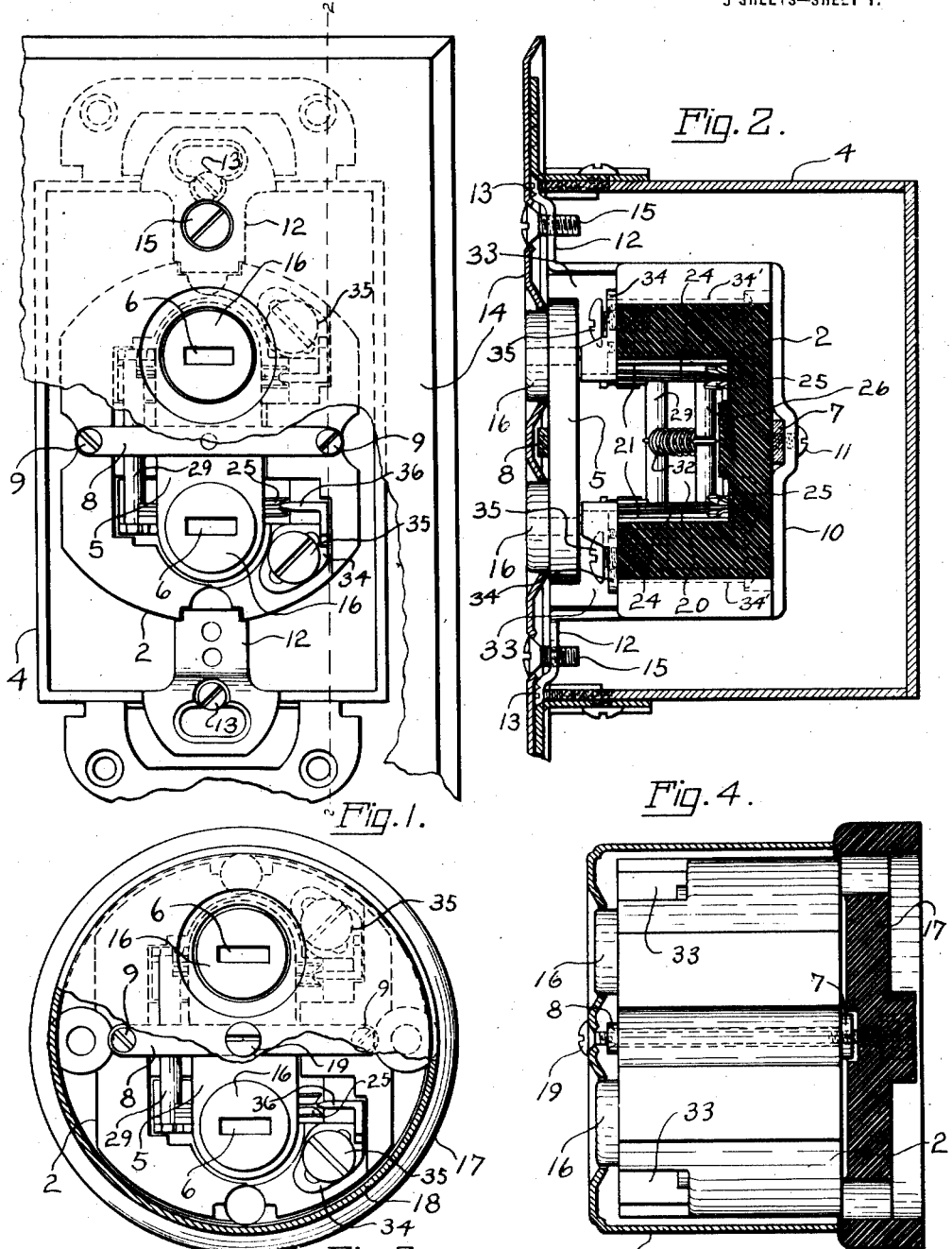

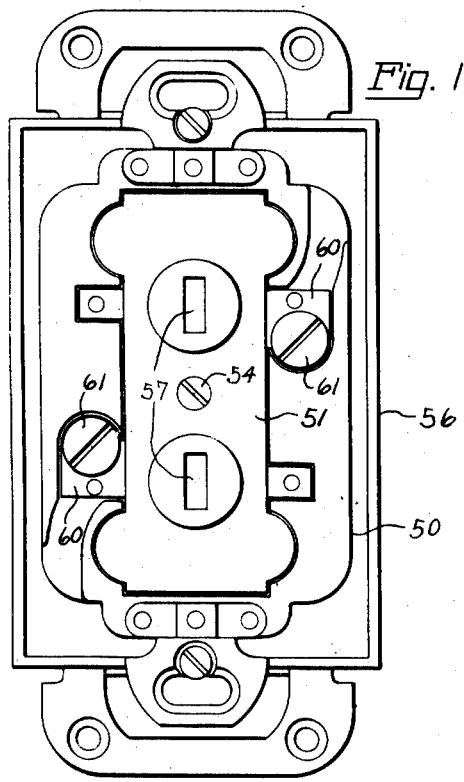
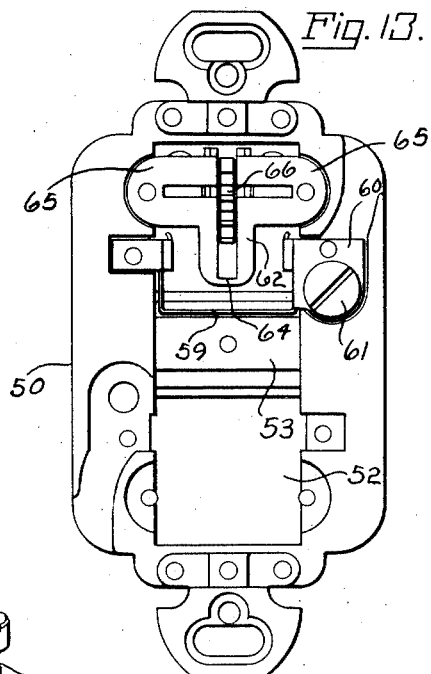
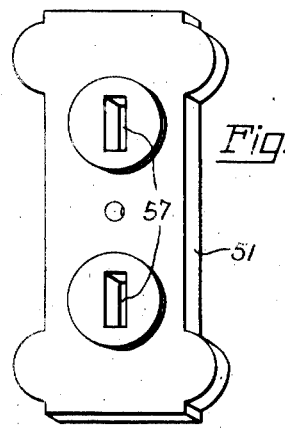
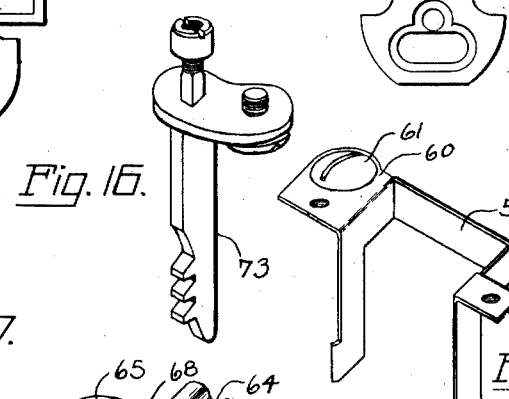
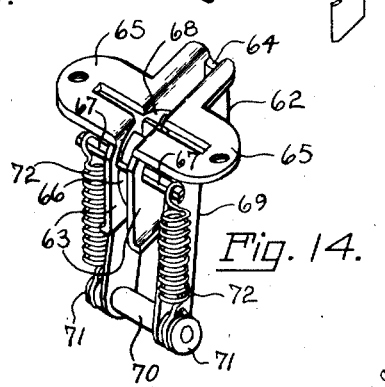

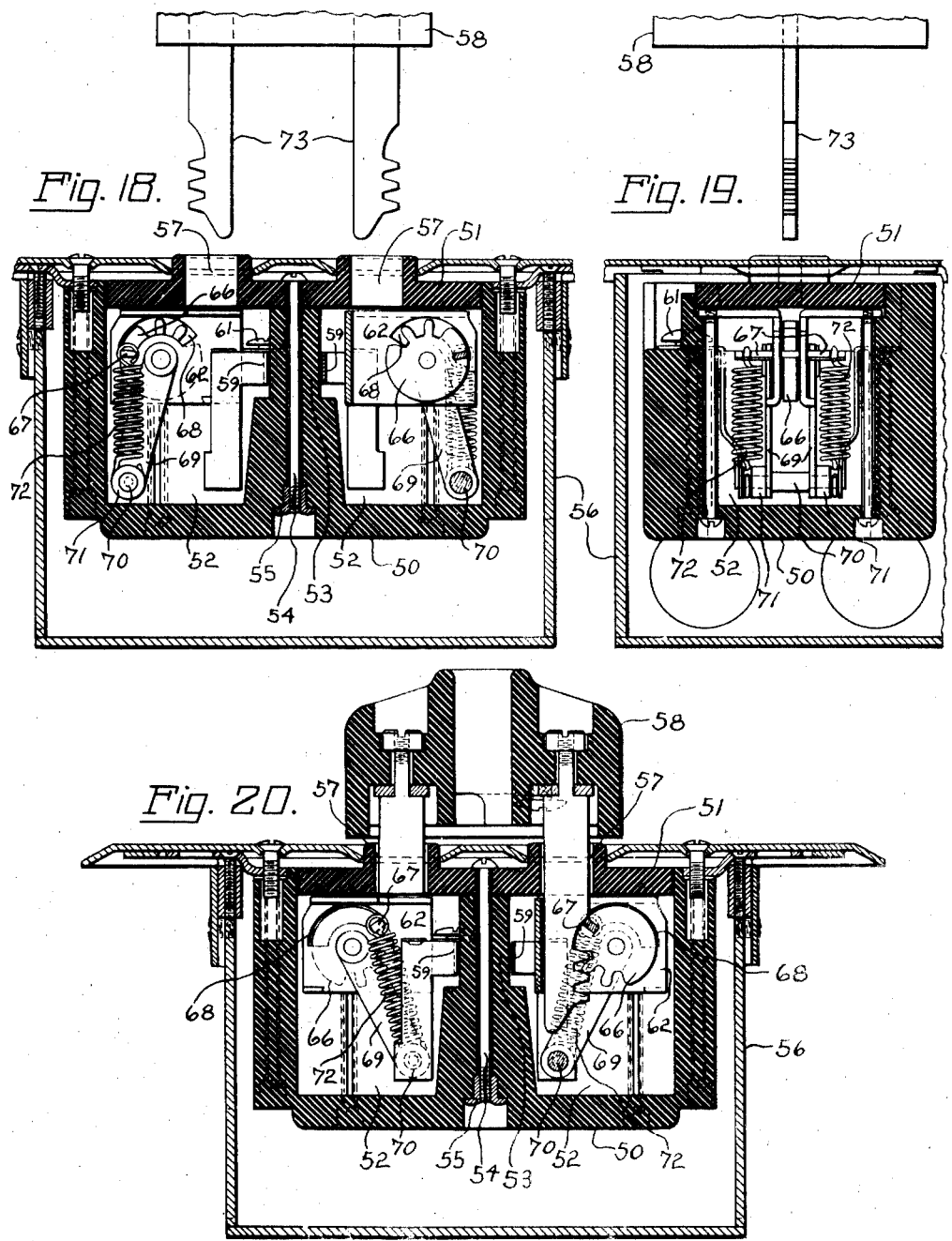

J. SACHS.
SAFETY ELECTRICAL CONNECTING APPLIANCE.
APPLICATION FILED NOV. 3, 1915.

1,365,729.

Patented Jan. 18, 1921.
5 SHEETS—SHEET 5.

Witnesses
Otto Hilton
Franz Wolter

Inventor
Joseph Sachs.
By Heath Lehland
Attorney

UNITED STATES PATENT OFFICE.

JOSEPH SACHS, OF HARTFORD, CONNECTICUT.

SAFETY ELECTRICAL CONNECTING APPLIANCE.

1,365,729.　　　　　Specification of Letters Patent.　　Patented Jan. 18, 1921.

Application filed November 3, 1915. Serial No. 59,489.

*To all whom it may concern:*

Be it known that I, JOSEPH SACHS, a citizen of the United States, residing at Hartford, in the county of Hartford and State of Connecticut, have invented certain new and useful Improvements in Safety Electrical Connecting Appliances, of which the following is a specification.

This invention relates to what for convenience may be termed a "safety electrical connecting appliance." Where it is desired to connect with an electric supply circuit, a portable electric lamp, mortar, heating or other electric appliance, or where it is desired to connect two wires or a plurality of wires to each other to continue the circuit through what might be considered an extension, it is usual to provide for this purpose an attachment device comprising two detachably connected members. As commonly used, one of these is a receiving or receptacle member, and the other a plug member, the receiving or receptacle member being generally connected with the service or supply side, while the plug is adapted for connection with the load. In some of these old devices the contacts of the receiving member, which contacts are normally alive are arranged in such manner that they will not be entirely exposed but still accessible to the contacts of the plug. In such cases it is obvious that there is an aperture in the receptacle member through which the contacts of the plug member are insertible so as to be brought into connection with the partially inclosed contacts of the receptacle member. In order to completely inclose the contacts of the receptacle member and make them even less accessible to anything other than the exact plug member, shutters or slides have been provided in the receptacle member which act automatically to close the apertures in said receptacle member when the plug member is removed, this condition being maintained as long as the receptacle and plug members are disconnected.

By my invention I produce an electrical connecting device which may be used for extension or attachment circuit purposes or for any other analogous use and secure the advantage of ready connection and disconnection at will of the complemental members of the device. My device comprises what may be termed a service or supply member and a load or extension member from which as may be inferred, the contacts on the service or supply member are adapted for connection with the service, while the contacts on the load or extension member are adapted for connection with the load of whatever nature it may be. Ordinarily but not essentially the service or supply member may for convenience be in the form of a receptacle member while the load or extension member may consist of a plug. In addition to providing for the ready connection or disconnection at will of the two members I obtain a feature of the utmost importance, namely maximum safety, in that the contacts on the service or supply member which coöperate with those on the load or extension member are normally dead. That is to say they are dead when the two members are separated, being rendered alive by the connection of the load or extension member with the service or supply member. When, therefore, the two members of my safety electrical connecting appliance are disconnected, it will be obvious that it is impossible to electrically connect, take current from, or bridge across the contacts referred to, of the supply or service member, unless the appropriate load or extension member is correctly associated therewith. In view of this condition it is not necessary to provide automatic shutters or slides to protect or cover up or hide the contacts of the supply or service member. In addition to the foregoing highly important advantage, there is another feature of practically equal importance owing to the fact that the actual breaking of the electrical circuit is not a result of the mere mechanical separation of the two members as in the case of the old devices. In the prior devices the mechanical joining or separation of the plug and receptacle members makes or breaks the circuit. As a consequence where large current or high voltages are necessary, or the conditions are otherwise such as to produce arcing upon the rupture of the circuit on the separation of the two members of the old devices, objectionable arcing frequently follows, which results in burning of the contacts. In my connection appliance the circuit is made and broken independently of the mechanical connection or disconnection of the contacts of the supply or service and load or extension members. It, therefore, follows that initially or on the act of instituting the mechanical separation of the two members, the contacts of the supply or service member are rendered dead, so that when the contacts of the respective members are separated, this is not accompanied by any arcing manifestations, because at such time the contacts on the supply or service member are dead.

In the drawings accompanying and forming part of the present specification I have represented in detail several of the many different forms of embodiment of the invention which I have selected for illustration and which will be set forth fully in the following description, so that those skilled in the art will be enabled to practise the invention. It is to be distinctly understood that I do not restrict myself to these several forms; as a matter of fact I can depart radically and materially from the showing made by said drawings and description, within the scope of the invention defined by the claims following said description.

Referring to said drawings:

Figure 1 is a face view of one member of the appliance shown as incased in a wall box covered by a face plate partially broken to show said member.

Fig. 2 is a longitudinal sectional view on the line 2—2 of Fig. 1, looking from the right.

Fig. 3 is a face view of the member in question inclosed in a different form of box or casing and mounted on a base.

Fig. 4 is a sectional side elevation of the showing of Fig. 3, the box and the base being in section and the inclosed part or member of the appliance being in elevation.

Fig. 5 is a perspective view of the member of the appliance shown in Figs. 1 to 4 inclusive.

Fig. 6 is a face view of said member with the guide plate removed.

Fig. 7 is a cross section taken on the line 7—7 of Fig. 6, and looking in the direction of the arrow, showing the guide plate just mentioned in position and also representing a portion of a companion member, the two members being separated.

Fig. 8 is a similar view, more, however, of the companion member being illustrated and the two members being fully connected.

Fig. 9 is a perspective view of electrically connecting and disconnecting means in the open position, corresponding to that of Fig. 7.

Fig. 10 is a perspective view of a service or supply end connection member.

Fig. 11 is a perspective view of a load or extension member coöperative with the supply or service member illustrated in views already described, a portion of the insulating body being removed.

Fig. 12 is a face view of another form of supply or service member incased in a wall box, the face plate of the box being removed.

Fig. 13 is a view of the supply or service member shown in Fig. 12 removed from the box, a part of the guide plate and a part of the electrical connecting and disconnecting means being removed.

Fig. 14 is a perspective view of a part of the electrical connecting and disconnecting means constituting a part of the supply or service member shown in Figs. 12 and 13, being in fact the part removed from Fig. 13.

Fig. 15 is a similar view of a service or supply end connection member which coöperates with the part shown in Fig. 14.

Fig. 16 is a like view of a connection and contact element of the load or extension member of the complete device, the body portion of said member being entirely removed.

Fig. 17 is a similar view of the guide plate.

Fig. 18 is a view of the supply or service member and casing shown in Fig. 12, in longitudinal central section, the principal part of the coöperating load or extension member being shown in elevation and the two members being shown separated.

Fig. 19 is a view of the parts shown in Fig. 18, the supply or service member and the box being in transverse section.

Fig. 20 is a longitudinal central section of the form of the appliance shown in Figs. 12 to 19 inclusive, with the two members thereof operatively associated.

Like characters refer to like parts throughout the several views.

Figure 21:
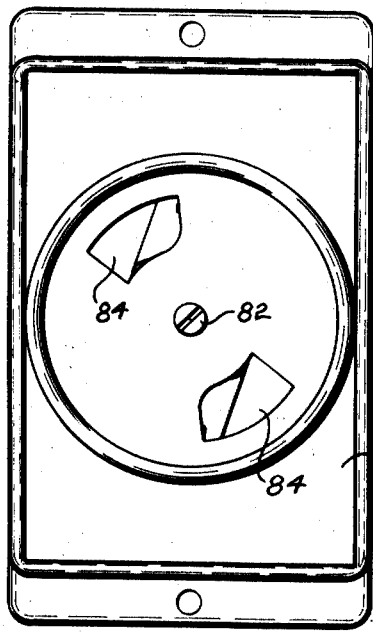
Fig. 21 is a face view of a still further form of service or supply member, the face plate of the boxing being shown in position.
Figures 22, 23:
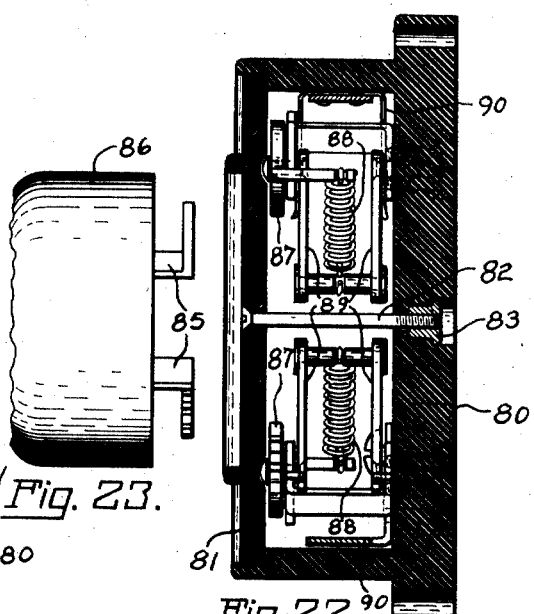
Fig. 22 is a longitudinal sectional view of the member of Fig. 21 and its housing.
Fig. 23 is a side view of the load or extension member coöperative with the service or supply member shown in Fig. 22, a portion of the insulating body being broken away.

The device as noted comprises separably associable members, what I have denoted as the service or supply member having a pair of normally dead contacts adapted to coöperate with contacts on the load or extension member, means being provided for rendering the contact on the service or supply member alive, on the relative movement of the two members. In the present case this particular function is secured through the mechanical connection of the two members. Preferably but not essentially the service or supply member has two pairs of terminals, one pair constituting the normally dead contacts to which I have alluded, and the other being capable of connection with the service or supply. The load or extension member has a pair of contacts of the supply or service member, the organization being such that when the two members are in a certain relation, fully connected in the present case, the two sets of terminals of the supply or service member will be preferably automatically bridged and will also be preferably automatically electrically disconnected on or during the mechanical separation of the two members. The two members can be connected or disconnected in any one of several ways, two of which are shown. In one of these two ways the connection is a straight one, while in the other it is about an axis. The service or supply member may be mounted in various ways; that hereinafter described is susceptible of interchangeable use with different types of casings.

Referring first to Figs. 1 to 10 inclusive I show one form of the device. In this form the device comprises a supporting body as 2 of insulating material such as porcelain which with the adjuncts carried thereby constitutes the service or supply member of the device. The load or extension member also comprises a supporting body as 3 which with the instrumentalities sustained thereby presents the load or extension member. This supporting body 3 is also of insulating material and like the body 2 may be made of porcelain. In Figs. 1 and 2 I have shown the service or supply member as mounted in a wall-box, whereas in Figs. 3 and 4 it is illustrated as fitted to a base and inclosed by a housing or cap as will hereinafter more particularly appear. These are simply two of the many ways in which the service or supply member can be inclosed. As will be obvious there may be instances where the service or supply member is wholly uninclosed, it being incased for protection. In Figs. 1 and 2 the numeral 4 represents a wall-box of familiar type in which the supporting body 2 is situated. Set into the front or outer side of the supporting body 2 is the guide plate 5 having duplicate slots 6 through which in the present case, the contacts of the load or extension member, hereinafter more particularly described, are introduced. Extending across the front and rear faces of the supporting body 2 and in alinement with each other are strips 7 and 8 connected to each other by the screws 9. The stirrup-like strap 10 receives the supporting body 2 and the transverse portion of said strap may be connected as by the screw 11 with the strip 7. The sides or branches of the strap 10 are outwardly offset as at 12 and may be fastened to the box 4 as by screws 13. The face plate 14 of the wall box is connected to the strap by screws 15 in threaded engagement with the outward extensions 12, the face plate having holes or perforations to receive the buttons 16 of the guide plate. The foregoing is one convenient way of mounting the service or supply member in a wall box such as 4.

The supporting body 2 may be attached as shown in Figs. 3 and 4 to an insulating base as 17. In this event the supporting body 2 will be taken from the box 4, the screw 11 removed and the strip 8 taken from place. It will be understood that the parallel strips 7 and 8 are connected by the screws 9 which extend entirely through the insulating supporting body 2. When, therefore, the strip 7 is taken from place the lower threaded ends of the screws 9 will be passed through perforations in the base 17 and will receive nuts so that the supporting body 2 can be rigidly connected with said base. After this is done, the shell or casing 18 will receive within it the supporting body 21, and the closed front of the casing may receive a screw as 19 adapted to be threaded into the strip 8 secured to the supporting body 2 and to pass through an approximately central opening in the closed front end of said casing or shell 18. The supporting body 18 is, therefore, universal with respect to the manner of its location in a casing. The casing or box 4 is rectangular while the casing 18 is practically cylindrical. I do not limit myself to any particular form of casing where one is present, but I deem it a matter of importance that I can mount the service or supply member of the device in casings which differ radically as to form.

The supporting body 2 has as shown a cavity or chamber 20 which in the present case receives the two sets of terminals to which I have referred. It will be remembered that one pair of terminals is normally dead or is dead when the load or extension member is disconnected from the companion member. This particular pair of terminals constitute in the present case contacts. The other pair of terminals, however, are adapted for connection in some suitable way with the service. I deem it of importance to mention the fact at this time that it is not essential at all times that the terminals or contacts which are connected with the service and are therefore alive, need not essentially be carried upon the service or supply member, although this is advantageous. In some cases these particular terminals may be otherwise mounted. In the cavity 20 are mounted the plates 21, duplicates as shown, of each other, the two plates in the present instance constituting suitable supporting means for certain devices hereinafter more particularly described. As represented the plates have inwardly extending flanges 22 attached in some suitable manner as by screws 23 to the bottom of the cavity or chamber 20. Between the plates 21 are mounted suitable switch arms as 24, the operative portions 25 of said switch arms being of clip type. As illustrated the two arms 24 are connected together near their adjacent ends by a part such as the rod 26 of insulating material, fiber answering satisfactorily in this connection. In the present instance the two switch arms 24 are coaxial. Being of metal they of course, constitute conductors and are insulated from each other by the rod 26. Through the outer ends of the switch arms 24 the pins 27 extend, said pins also extending through gear members 28, duplicates of each other, and located on the outsides of the plates 21. The two gear members 28 are connected together as shown by the rod 29 which insulates said gear members and also insures their movement together. The gear members 28 are loosely carried by the respective pins 27 and in turn the pins loosely support the respective switch arms 24 from which as will be evident the gear members 28 and switch arms are movable relatively to each other. The pins 27 can be held from accidental displacement and also to hold the switch arms and gear members in operative connection by being headed over and if desired, one head may be integral, and the other in the form of a washer. Each of the plates 21 is provided with stops as 30 and 31 engageable alternately by the rod 28 to limit the motion of the rod and therefore of the parts movable therewith. In other words when the rod 30 strikes the companion stops 31, this will indicate that the connectors or switching arms 24 are in their on relation, whereas when the rod 29 strikes the complemental stops 30, this indicates the fact that the switching arms or connectors 24 are in their off relation. It will be clear that the rod or pin 29 moves in an arc concentric to the axes of motion of the gear members 28 and switching arms 24. Connecting the rods or pins 26 and 29 is a spring 32 which is adapted to impart a snap movement to the switching or bridging element made up in the present case of the two connected arms 24 as will hereinafter more particularly appear.

Opposite sides of the cavity or chamber 20 are cut away as at 33 to receive the bodies of wire connecting and contact members as 34, these bodies being fastened to the bottoms of the respective cut away portions 33 in some suitable manner as by screws 34' while screws 35 are provided to connect the wires with the wire connecting and contact members 34. Said wire connecting and contact members are provided with flanges 36 constituting contact portions or the contacts proper, one part of each flange 36 extending into the cavity or chamber 20 and being positioned to receive a coöperating clip 25. It will be clear that the outer end of the spring 32 or that which is connected with the coacting gear members 28 is movable back and forth across a dead center line intersecting the axis of motion of the switch arms 24 and gear members 28 and the center of connection of the spring 32 with the rod 26 or what is the same thing the axis of said rod 26. By moving the gear member connected end of the spring 32 across this dead center line, the switch arms 24 will be moved simultaneously to the off position as shown in Fig. 7 or to the on position as illustrated in Fig. 8. In the present case this particular action is effected by the contacts of the extension or load member of the device of whatever form they may be.

The supporting body of the extension member is provided with contacts 37 of similar construction made in the form of racks and coöperative respectively with the gear members 28, these contacts or racks being of conducting material and being insertible through the guide slots 6. The wire connecting members 38 are set in sockets 39 in the under side of the supporting body 3, the shanks of the contacts extending through said wire connecting members 38 and being threaded to receive nuts as 40 by which the contacts 37 and wire connecting members 38 can be held in assembled relation. Threaded into the wire connecting members 38 are screws as 41 which present a convenient means for mechanically and electrically connecting the wires of the extension circuit with the respective connecting members 38. In Fig. 7 the switching arms 24 are shown as open, the gear member connected end of the spring 32 being at one side of the dead center line to which I have referred. The two gear members 28 constituting the contacts, are, of course, dead, although the terminals 34 connected with the service are of course, alive. To electrically connect the extension or load member with the service, the following procedure may be adopted: The racks 38 will be passed through the slots 6 and the tips of the racks will engage the shoulders 42 of the gear members 28, so that as the supporting body 3 is moved toward the companion supporting body 2, the racks by engaging said shoulders will turn the two members until the teeth of the two racks come in mesh with those of the gear members. Continued movement of the supporting body 3 toward the supporting body 2 will cause a further advancing motion of the two gear members 28, thus carrying the gear member connected end of the spring 32 across the dead center line and the spring acting against the rod 26 will cause the switch arms 24 to be snapped to the position shown in Fig. 8, so that the clips 25 can straddle the contact portions 36 of the wire connecting members or terminals 34 thus bridging across the two sets of terminals on the supporting body 2. This renders the contacts 28 alive and as these contacts 28 are engageable by the contacts 37, the latter will also be made alive. On withdrawing the supporting body 3 or moving it away from the companion member 2, the operation will be reversed and the switching arms 24 will when a predetermined amount of retractive movement of the supporting body has been accomplished, snap the clips 25 away from the contact portions 36, thus breaking the circuits and deadening the contacts 28 and also the contacts 37 when the bridge between the two sets of terminals on the supporting body 2 is ruptured.

Referring now to Figs. 12 to 20. The service or supply member comprises a supporting body 50 having the removable cover 51 and the interior chambers 52 separated by the partition 53, the cover being held in place to the body of the supporting member by the screw 54 and nut 55. This supporting body may like the other be mounted in any desirable manner. It is shown fixed in the wall box 56. The cover 51 has slots 57 to receive the contacts hereinafter described, constituting a part of the extension or load member which comprises in its make up a supporting body as 58 of insulating material such as porcelain. Fixed in the cavities 52 are yoke-like terminals as 59, one leg of each having a flange 60 to receive the screw 61 by which a wire can be connected thereto. These terminals or contacts 59 are normally alive, being connected at all times with the service or supply. They are practically against the partition or wall 53. Fitted in the upper portions of the respective chambers or cavities 52 are supporting members as 62 each of said supporting members consisting of sides 63 and a connection 64 uniting the same, the sides being flanged as at 65 and the flanges in turn being perforated to receive fastenings as screws by which the respective supports can be fixed in position. Pivotally mounted between the sides 63 are gear members as 66 through which pins as 67 extend, said pins projecting through arcuate slots 68 in the side 63. The slots 68 are concentric with the axes of motion of the respective gear members. The pivots for the gear members are provided exteriorly of the sides 63 with the arms 69 connected in turn by the pins 70 which extend through the respective arms and are furnished with buttons 71 to which the outer ends of the coiled springs 72 are connected, the inner ends of said springs being connected with the outer ends of the pins 67. The gear members and arms 69 are movable relatively to each other on the pivots.

The supporting body 58 has connected thereto contacts 73 which are in construction and mounting like the contacts 37 already described. In Fig. 18 the arms 69 are shown as being off from which as will be inferred that the gear members 56 constituting contacts are dead, the supporting body 58 being disconnected with the supporting body 50. It will be assumed that the contacts or racks 73 are passed through the slots 57 in the cover 51 and that the racks engage the gear members 66 as already described. As the two supporting bodies 50 and 58 are moved toward each other, the gear members 66 are simultaneously turned to cause the gear member connected ends of the springs 72 to approach and then cross a dead center line intersecting the outer ends of the springs and the centers of motion of the respective gear members. When the gear member connected ends of the springs do cross said dead center line, the buttons 71 are snapped into engagement with the legs or branches of the respective terminals or contact members 59, thus rendering the gear members 66 and necessarily the contacts 73 alive. On the disconnection of the two members of the device the operation is reversed as already noted in connection with the other forms of the device. In both said forms the motion in connecting the two members of the device is a straight one. In one case the switching members are connected together. In the other there is no direct mechanical connection between them, although they do move simultaneously toward circuit making and breaking positions. Instead of using two switching members, any suitable number may be arranged or if desired only a single switching member operating in the manner and for the purpose set forth, may be utilized.

Figure 24:
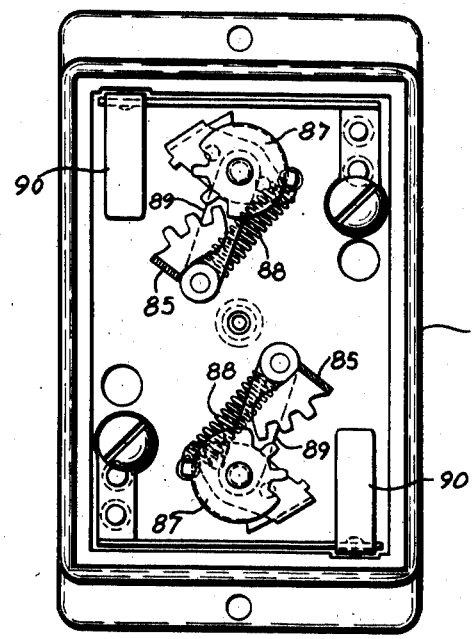
Figs. 24 and 25 are views of the supply or service member of Figs. 21 and 22 in its housing, the face plate of the housing being removed, Fig. 24 showing the parts as off, and Fig. 25 illustrating the parts as on. These two views also represent portions of the coöperative load or extension member in associated relation.
Figure 25:
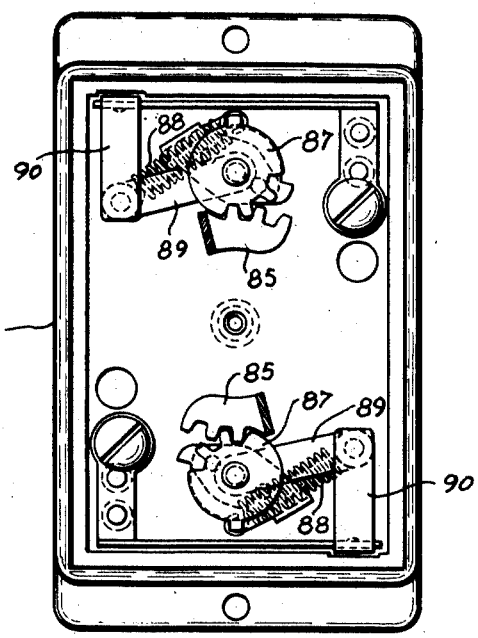

In the form of the device shown in Figs. 21 to 24 inclusive, the connection between the members of the device is secured by a rotary motion. As will be clear I do not restrict myself to any particular form of motion and have merely described two. As a matter of fact the invention does not reside in any particular details but consists rather in certain broad relations. In the form of the device now under consideration there is a supporting body 80 having the removable cover 81 held to the supporting body by a screw 82 and nut 83 as already described. The cover member 81 has in it the approximately diametrically opposite slots 84 each in the form of an arc and of practically duplicate character, the slots being adapted to receive the contacts 85 projecting from the insulating body 86 of the load or extension member. The racks 85 are practically of segmental form. This particular form of the invention will require but comparatively short description. The gear members 87 are mounted in the chamber of the supporting body 80 and are connected by springs 88 with switching members 89 cooperative with terminals or contacts as 90 fastened within the supporting body 80. In Fig. 24 the switching members 89 are shown as off. To move them to on the following operaton will take place: The segmental racks 85 will be passed through the slots 84 and the supporting body 86 will then be turned so as to cause the racks to turn the gear members 87 and through the springs 88 to snap the switching member 89 from the off position to the on position as shown in Fig. 25 where the free ends of the switching members can engage the ends or terminals of the contacts 90. On opposite movement of the supporting body 86 the switching members 89 can be snapped to off position at which time the supporting body 86 can be separated from the supporting body 80.

What I claim is:

1. A device of the class described comprising two separably-associable members one of which is provided with contacts, one alive and the other normally dead when the two members are unassociated, the other member having a normally dead contact associable with the normally dead contact of the first member, said dead contact on the second member being in itself provided with means for effecting a live connection to said dead contacts only when the two members are fully associated, the device having quick acting means for effecting such electric connection.

2. An electric plug and socket device comprising a socket member having a live and a dead contact, and a plug member having a normally dead contact associable with the contact of the socket member which is dead when the two members are unassociated, said dead contact on the plug member causing the connection of the dead contacts to the live contacts only on the substantially complete association of the plug and the socket members, the device having quick acting means for effecting such electric connection on the mechanical association of the parts.

3. An electric plug and socket device comprising a socket member having a live and a dead contact, and a plug member having a normally dead contact associable with the contact of the socket member which is dead when the two members are unassociated, said dead contact on the plug member causing the connection of the dead contacts to the live contacts only on the substantially complete association of the plug and the socket members and the socket member having a quick acting means for effecting such electric connection.

4. A connecting member having a normally live contact and a movable normally dead contact, and means set in action by the normally dead contact on the movement thereof, for electrically bridging across the two contacts.

5. A connecting member having a live contact and a dead contact, the latter comprising a gear, and means set in action by the dead contact on movement thereof, for electrically bridging across the two contacts.

6. A connecting member having a normally live contact and a normally dead contact, a second connecting member provided with a contact to engage and move the normally dead contact on the relative movement of the members, and means for bridging across of the live and the dead contacts when the dead contact is thus moved.

7. An electrical device comprising two members, one of which is rotative and one of which is provided with a live contact and with a dead contact and the other of which is provided with a contact coöperative with said dead contact, and means for electrically bridging across the live and the dead contacts by and on the relative rotation of the two members.

8. In an electrical device, companion connecting members, normally live and dead contacts associated with one of said connecting members, said normally dead contact being adapted for engagement with the contact of the companion connecting member, and means set into action by said engagement and the relative movement of one of said members to the other for bridging across from said live contact to said dead contact.

9. In an electrical device, companion connecting members, normally live and dead contacts associated with one of said connecting members, said normally dead contact being adapted for engagement with the contact of the companion connecting member, and means set into action by said engagement and the relative movement of one of said members to the other for bridging across from said live contact to said dead contact.

In testimony whereof I affix my signature in the presence of two witnesses.

JOSEPH SACHS.

Witnesses:
L. L. MARKEL,
HEATH SUTHERLAND.